United States Patent [19]

Berger et al.

[11] 4,209,845
[45] Jun. 24, 1980

[54] FILE QUALIFYING AND SORTING SYSTEM

[75] Inventors: David A. Berger; John W. Welch, both of Austin, Tex.

[73] Assignee: International Business Machines Corporation, Armonk, N.Y.

[21] Appl. No.: 762,374

[22] Filed: Jan. 25, 1977

[51] Int. Cl.² .............................................. G06F 7/02
[52] U.S. Cl. .................................. 364/900; 340/146.2
[58] Field of Search ........................ 444/1; 340/146.2; 235/156; 364/700, 200 MS File

[56] References Cited

U.S. PATENT DOCUMENTS

| 3,540,000 | 11/1970 | Bencher | 364/900 |
| 3,713,107 | 1/1973 | Barsamian | 364/900 |
| 3,927,391 | 12/1975 | Cantrell | 340/146.2 |
| 3,931,612 | 1/1976 | Stevens et al. | 340/146.2 |
| 4,007,439 | 2/1977 | Semmelhaack et al. | 340/146.2 |

*Primary Examiner*—Leo H. Boudreau
*Attorney, Agent, or Firm*—Douglas H. Lefeve; J. B. Kraft

[57] ABSTRACT

A system for sorting records of a file to find the record in the file having the highest or lowest data in a first field of the records, provided that the record qualifies to be sorted in accordance with the data in a second field of the records. A plurality of such records are stored on a plurality of blocks of a segmented serial storage device. Random access memory used by the system to accomplish the qualifying and sorting is a small fraction of the size of the file. In the preferred embodiment, a multiplicity of qualifying fields and sort fields may be specified. The system may typically be used, for example, to provide names, addresses and other variable text to be merged with form letter text in a printing system to sequentially print automatic form letters in the alphabetical or zip code order of their intended recipients. This information can also be used to list a qualified sublist of a master file in the order specified by the sort information.

10 Claims, 10 Drawing Figures

FILE QUALIFYING AND SORTING SYSTEM

CROSS-REFERENCE TO RELATED APPLICATIONS

U.S. patent application Ser. No. 595,840, filed July 14, 1975, having Robert Glenn Bluethman, et al as inventors and entitled "System for Merging Data Flow", assigned to the assignee of the present application, now U.S. Pat. No. 4,064,557.

U.S. patent application Ser. No. 693,818, filed June 7, 1976, having Margaret Mary Blevins, et al as inventors and entitled "Text Merge With Copies And Envelopes", assigned to the assignee of the present application.

BACKGROUND OF THE INVENTION

1. Field of the Invention

This invention relates to sorting in general and more particularly to the sorting of qualified records that are contained in multiple record blocks of a segmented storage device.

2. Description of the Prior Art

Text processing systems providing automatically printed letters or other documents including fixed text that is used in each document merged with variable text to individualize the document are well known in the art. This function was performed by the dual tape IBM Magnetic Tape "Selectric" ® Typewriter by placing the fixed text on one tape and records of variable text on the other tape with switch codes appropriatedly interspersed in the text of the two tapes to cause merging of the text to provide printing of a series of individualized documents in a relatively unattended manner. This function was also provided in an improved manner in the IBM Mag Card II Typewriter, as described in the above-referenced, copending patent application Ser. No. 595,840. The flexibility of this function was further improved upon in the IBM 46/40 Document Printer, as described in the above-referenced, copending patent application Ser. No. 693,818, by provision of the capability to choose only selected fields of a record of variable data to be used exclusively in a letter while other fields are used for a corresponding envelope.

In none of the above systems is there a capability for the screening of records to provide automatically printed documents corresponding to only those records that quality in accordance with data supplied by an operator. For example, a field may be included with each record in a file that corresponds to the profession of the person named in the file. It may be desirable, for instance, to send a letter only to the dentists named in the file of records. Further, none of the above systems provided the capability to sort the records to, therefore, output the documents in a preferred order, such as alphabetically or grouped by postal zip code. Grouping of letters by zip code for mailing provides a discount in postal rates that becomes very significant in large mailings.

The qualifying and sorting of data has been long practiced in the art. For example, U.S. Pat. No. 3,343,133 entitled "Data Handling System" provides a background for the sorting of data. In discussing the object of providing documents in a sorted sequence from records that qualify in accordance with predetermined conditions, it becomes pertinent to consider the constraints and limitations of a practical office system to accomplish this result. Typically, a segmented storage device such as a disc or a magnetic tape, containing a plurality of fixed-length blocks, might be used to store a large file of records. Numerous records may be included on each block of the storage device. If unlimited random access memory is available, a relatively simple implementation is to read the entire file into the random access memory, rearrange the file in the memory by sorting and qualifying the records, and merging the appropriate fields of the records from the random access memory for output printing. With large files, this approach becomes economically prohibitive for a typical office text processing system.

In the referenced U.S. Pat. No. 3,343,133, the amount of random access memory needed to perform sorting is reduced by providing a plurality of segmented storage devices and means to transfer data from these devices back and forth through the memory. This approach, however, introduces a possibility of degradation of the integrity of the data in the files since errors may occur in writing the data back onto the storage devices. Alteration of the data on the storage devices also requires increased accessing of the blocks on the storage device which increases mechanical wear in the accessing mechanism, itself, and adds additional time to the sorting operation.

A technique known in the prior art as the quadratic sort has been used to order the sequence of data records by structuring these records into N record groups with each of the N record groups containing N records. Each of the groups are then sorted for the lowest or highest record in the group and then each of the sorted records are further sorted to find the lowest or highest record in the file. To apply this technique to a file having a variable number of records on a variable number of storage blocks, the data would have to be restructured on the storage device by reading it into a memory, dividing it into the same number of storage blocks as the square root of the number of records in the file and rerecording the data onto this number of storage blocks. However, the required number of storage blocks may not be available on the storage device. Further, as in the above technique, this technique introduces the possibility of alteration of the records due to writing errors and also increases the wear of the mechanical accessing components associated with the storage devices by the additional accessing required for rewriting the data.

It would therefore, be advantageous, to provide a system for sorting qualified data records to provide ordered, sequential accessing of appropriate records to a printing system in an economical and efficient manner, without introducing the possibility of alteration of the records due to writing errors and with minimization of wear of the mechanical accessing components associated with the storage device and with a substantially small random access memory requirement.

SUMMARY OF THE INVENTION

Accordingly, the disclosed system provides for sorting the records of a file which are of variable format (variable record length, variable number of fields and variable field length.) stored on a plurality of blocks of a segmented storage device to access the record in the file having the highest or lowest data in a first field of the records provided that the record qualifies to be sorted in accordance with the data in a second field of the records. As an example, assume that a letter is to be sent only to each engineer listed in the file and that the letters are to be prepared in accordance with the postal zip code sequence. Thus, the qualification is that the field of the records associated with job or profession includes that of engineer. The records must then be accessed in the sort sequence, for example, starting with the lowest zip code number and proceeding to the highest, for engineers only.

It is, of course, recognized that the sorting could be accomplished starting at this highest zip code number and proceeding to the lowest. For the purposes of discussion in the remainder of this application, assume that sorting is effected in ascending order from a lower number or letter to a higher number or succeeding letter or letter group in the alphabet.

The segments of the segmented storage device are called blocks. A variable number of records may be stored on each block, depending on the length of the records. The blocks contain a fixed number of storage positions. Records are separated from each other on the blocks by beginning of record and end of record flags. The records may be of varying length; thus, more short records can be stored on a block than long records.

The system includes logic for finding the record in each block having the lowest data in the sort field of only those records that qualify to be sorted in accordance with the data in the qualification field of the records. Upon finding such record, if any, in each block a list is stored including the lowest sort field for a qualifying record in each block along with a record identifier identifying the record from which the field was found. The system includes logic for then finding the lowest data in the stored list, which is the lowest data in the chosen field for any qualified record in the file. Logic is then provided for accessing the record identified by the record identifier corresponding to said lowest said data found in the list.

The fields of the records may be of variable length. The sublist, since it is stored in a finite amount of memory is divided into items that are a predetermined maximum length. Therefore, it is possible that not all information from the sort fields of a record can be carried along into the item list. The record identifier is carried along into the sublist with the item for the following reasons: (1) to insure that a greater than or less than compare can be made (every record identifier is unique), and (2) to identify the smallest record for future use.

In the preferred embodiment logical AND and OR conditions for qualifiers may be set up. Thus, records can be selected in which the sorting is performed only on those records that include "engineer" in the profession field AND "Kansas" in the state of residence field. Further, by specification of "engineers" AND "Kansas" OR "accountants" AND "Illinois", records can be sorted for all of the engineers in Kansas listed in the file as well as all of the accountants in Illinois listed in the file. Multiple sort fields can also be specified so that if equal conditions occur in the primary sort field of a qualified record, the record can be sorted in accordance with the data in the specified secondary sort field.

The system also is operable to begin operation in the middle of a sort, from a record including sort field data higher than the lowest corresponding sort field data in the field. This is advantageous when the system must be stopped in the middle of a document printing sequence at the close of working hours and restarted on the next day. The operator enters data identifying the last previous qualified record used and the system ignores sort fields having lower values than the sort field in that record.

The foregoing and other objects, features and advantages of the invention will be apparent from the following more particular description of a preferred embodiment of the invention, as illustrated in the accompanying drawing.

DESCRIPTION OF THE PREFERRED EMBODIMENT

It is assumed, for the purposes of illustration, that logic requiring positive inputs for a positive output is employed unless otherwise indicated. That is, the logic circuits such as AND and OR gates, for example, are operated by positive signal levels at the input to produce a positive signal level at the output. Logical levels which are not positive will be termed negative.

It will also be understood by those skilled in the art that the logical storage devices such as registers, latches, counters, shown in FIGS. 1-9, are responsive to clock signals to assume, at the next leading edge of the clocking waveform, a state associated with an input signal applied thereto immediately before the leading edge of the clocking waveform, such logic being referred to in the art as synchronous logic. For the purposes of description hereinafter, one clock period will be referred to as a bit time.

Figure 1A:
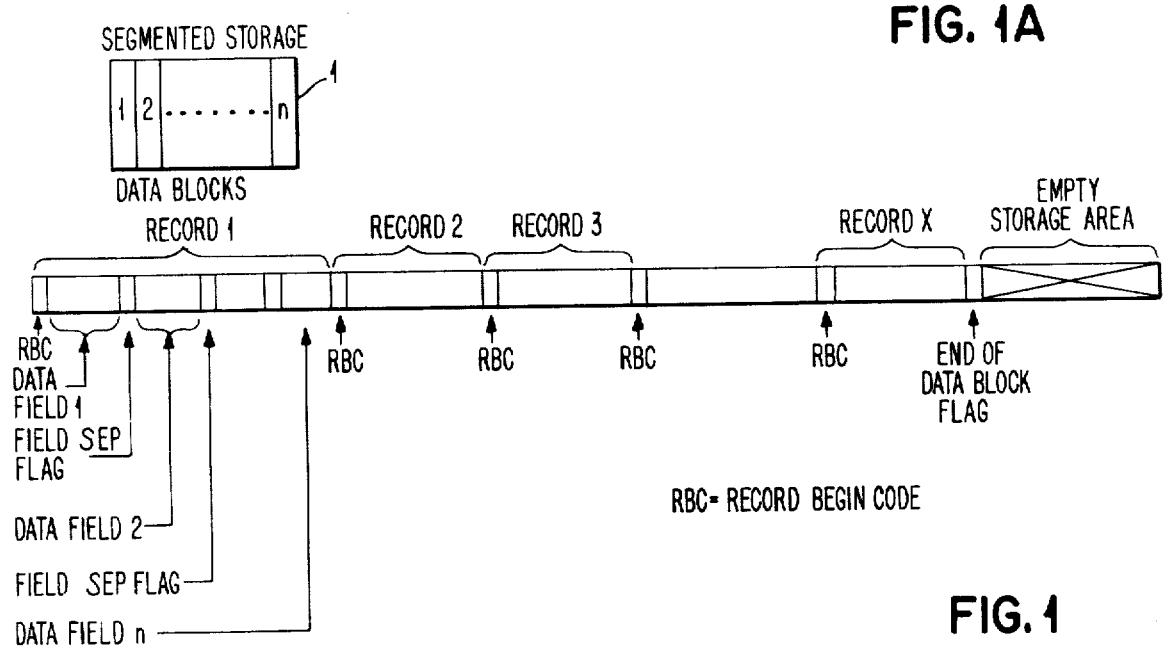
FIG. 1A shows the recording sequence of a typical data block.
Figure 1:
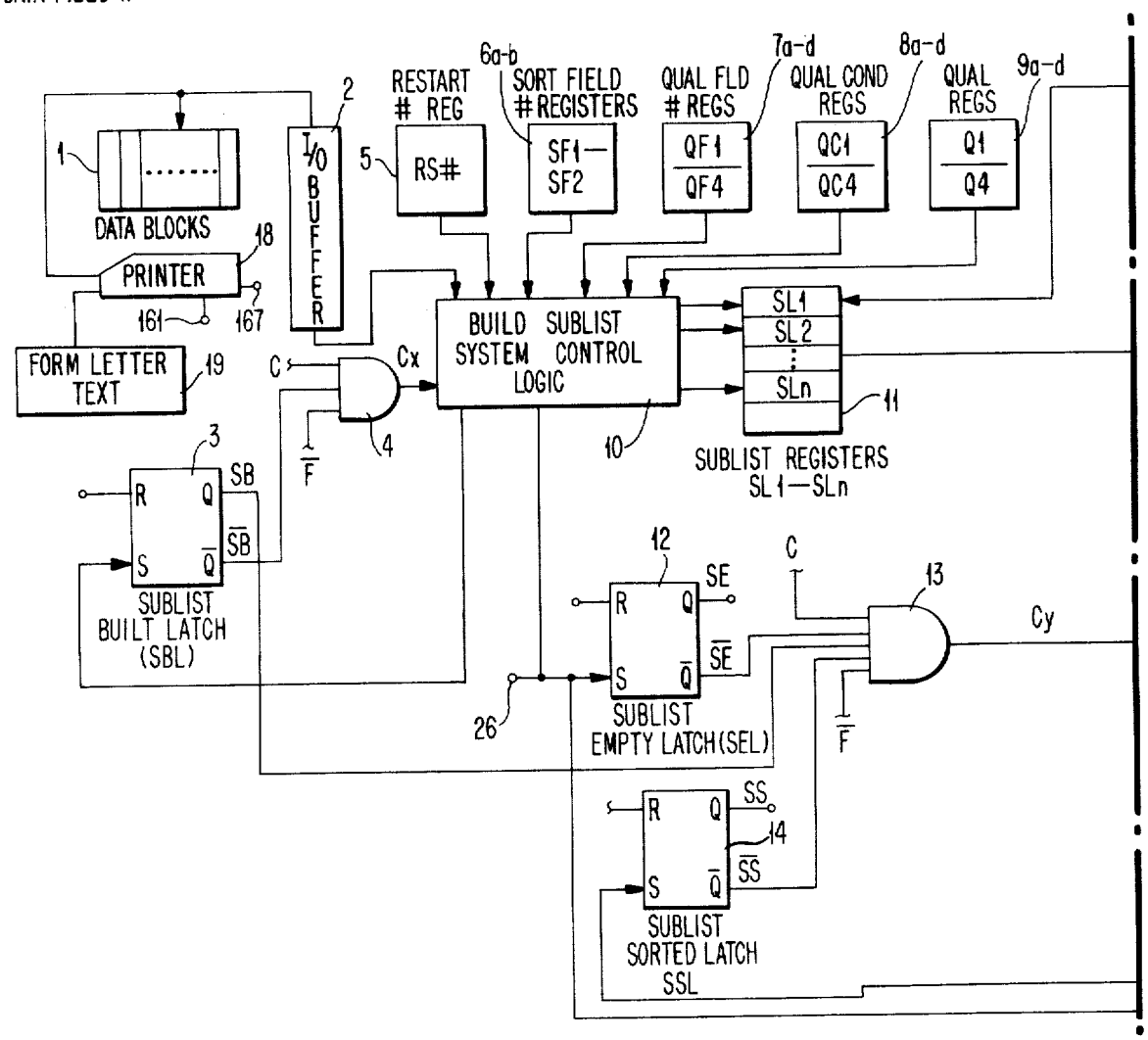
FIG. 1 provides an overview of the entire file qualifying and sorting system of this invention.
Figure 1:
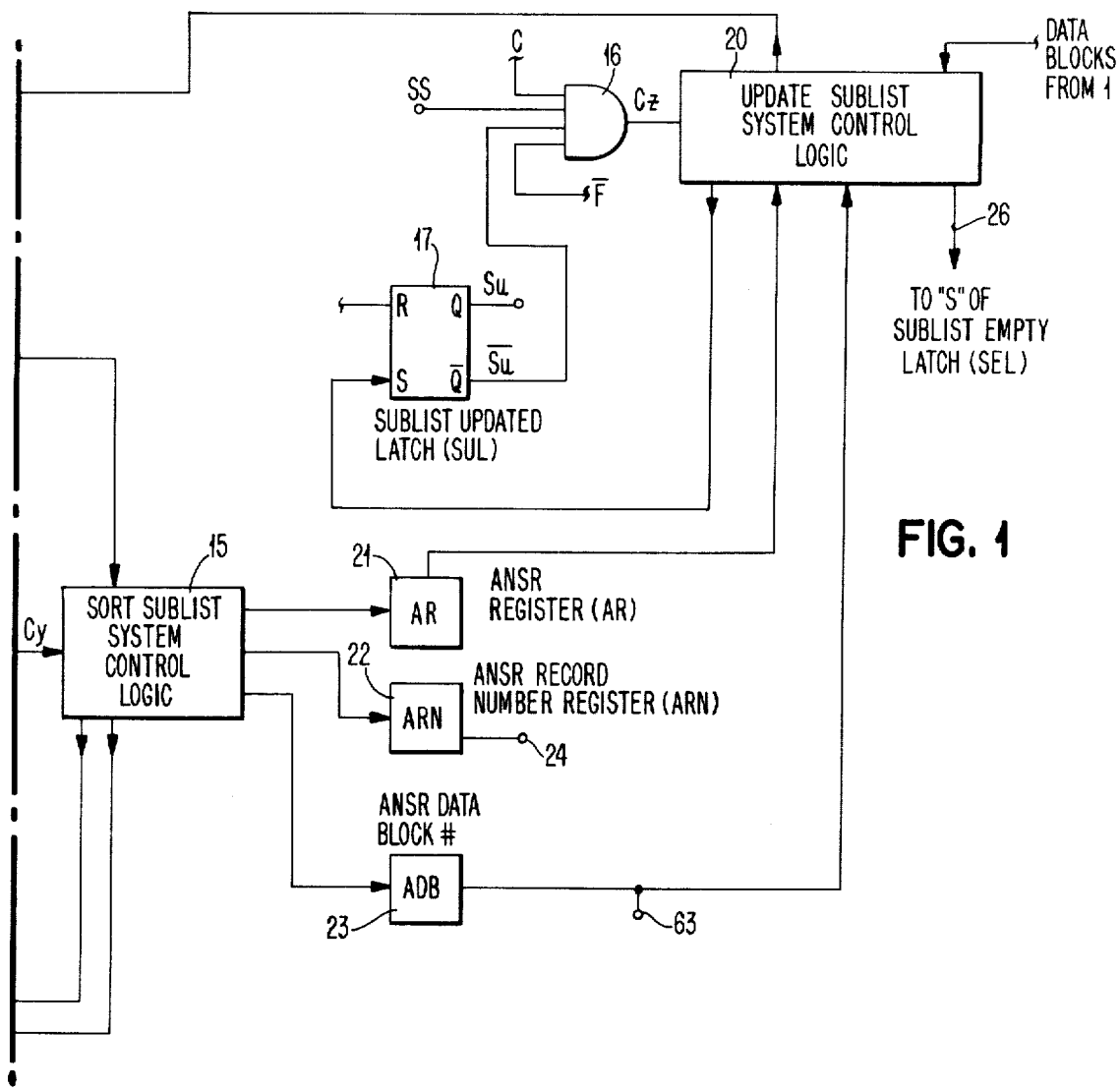

Referring now to FIG. 1, the system is initialized for operation by resetting all of the latches and clearing all of the registers. Certain registers are then initialized in accordance with the following description given hereinafter.

The storage device 1 may be, for an example, a disc containing a plurality of tracks, each track corresponding to a block of storage.

FIG. 1A shows the recording sequence on a typical data block in storage 1. It is shown that a plurality of records of varying length are stored on each fixed length storage block. The fields of the record, which are of variable length, are separated by field separation flags. The first field of each record is the record identifier code and is unique. Each record is preceded by a record begin code, and following the last record is an end of data block flag.

In FIG. 1 it is shown that the qualifying and sorting operation comprises control logic to build a sublist in which the lowest data above an initial condition in specified fields of qualified records on each block are found by control logic 10 and loaded into sublist registers 11. Control logic 10 is responsive to a record number loaded by the operator into restart register 5 which specifies the qualified record having the lowest data in the specified sort fields against which the data in the sort fields of the other qualified records is to be compared. The operator also loads the numbers of the sort fields into sort field register 6a–b that is input to control logic 10. In this example, the operator may specify two different sort fields, a primary sort field and a secondary sort field. Into qualify field registers 7a–d, the operator loads the numbers of the fields in the records that are to be examined for the purposes of qualification. Into qualify condition registers 8a–d, the operator loads the conditions (equal, not equal, greater than, less than, etc.) that must be compared with the data loaded into the qualify registers 9a–d corresponding to each qualify field specified in registers 7a–d.

As an example of the above-described initialization, assume that the system was in the middle of a sort when it was last halted and that record number 127 was the last record from which data was selected for printing. The operator then loads the number 127 into register 5. Assume that the printing job encompassed the output of the individualized letters in alphabetical order by name of persons listed in records of a file. Assume that the letters were to be prepared only for the engineers in Kansas and the accountants in Illinois listed in the file. Thus, if the last name is the second field in each record, the first name the third field in each record, the profession the fourth field in each record, and the state of residence the fifth field in each record, sort field registers 6 would be loaded with two and three, qualify field registers would be loaded with four and five or four and five, qualify condition registers would be loaded with equals, equals, equals, and equals, and qualify registers would be loaded with engineers, Kansas, accountants, and Illinois.

Figure 2:
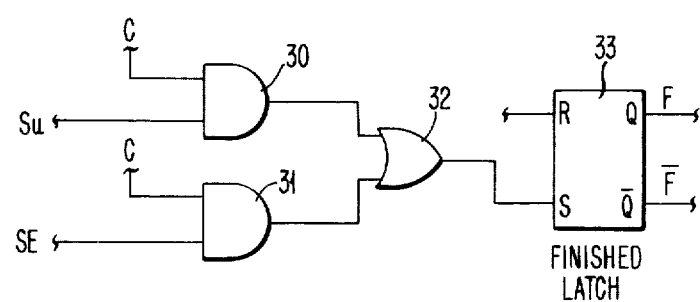
FIG. 2 shows the logical circuitry for controlling the finished or not finished state thoughout the system.

Referring to FIG. 2, since latch 33 is reset upon initialization the $\overline{F}$ signal is provided which is input to AND gate 4 in FIG. 1. The sublist built latch 3 in FIG. 1 is also reset which provides the $\overline{SB}$ signal to AND gate 4. Thus, clock signals to AND gate 4 activate the built sublist system control logic 10 to access the records of the data block in storage 1, and provide the data to I/O buffer 2 and then into control logic 10 so that the qualified record in each block having the lowest sort fields that are above those of the record specified in restart register 5 may be loaded into sublist register 11. When sublist registers 11 have been fully loaded, a signal is provided by control logic 10 to the set input of sublist built latch 3 which provides a positive SB signal for an input of AND gate 13. The $\overline{SE}$, $\overline{SS}$, and $\overline{F}$ signals from latches 12, 14 and 33, respectively, are also input to AND gate 13, enabling the clock signal to be gated through AND 13 to activate the sort sublist system control logic 15. Control logic 15 then examines each item of data from the sort fields stored in the sublist registers 11 to determine the lowest qualified item and outputs this answer to answer register 21, the record identifier corresponding to the answer to answer record number register 22 and the data block on which the record is stored to answer data block register 23.

When the sublist has been sorted, the control logic 15 sets sublist sorted latch 14 which provides a negative signal at the $\overline{Q}$ output thereof to disenable AND gate 13 which ceases the sublist sorting operation. The record number containing the answer is provided to printer 18 via line 167 so that the printer can then access this record for merging the variable data therein, or certain selected fields thereof, into an individualized letter with the constant text of the letter being stored in from letter text buffer 19. With the sublist updated latch 17 and finished latch 33 reset, the set condition of latch 14 provides the positive SS signal to enable AND gate 16 to gate clocking signals to drive the update sublist system control logic 20 to access the data block from which the answer was obtained and reload the corresponding portion of sublist registers 11 with the lowest applicable sort field data that is higher than the answer, from the sort field data that is associated with records in that block that qualify. After this operation is completed, if no valid data is in the sublist a positive output signal on line 26 of control logic 20 sets the sublist empty latch 12 to provide a positive SE signal which is applied to an input of AND gate 31 (FIG. 2) enabling a clock pulse to be gated through OR gate 32 to set the finished latch 33. Also, after each update, the sublist updated latch 17 becomes set which also sets the finished latch 33. Control logic 20 is shown in detail with respect to FIG. 9.

Figure 3:
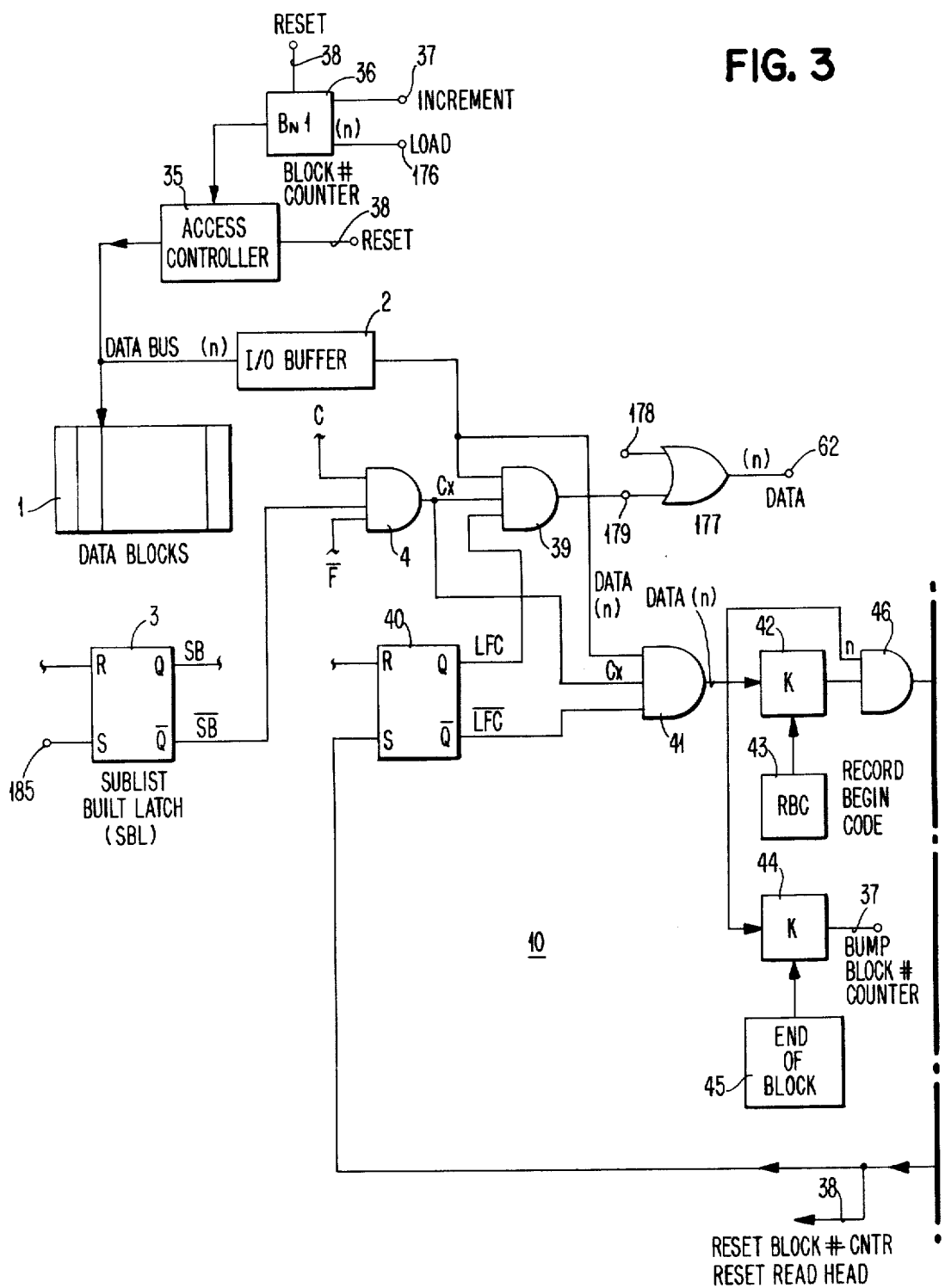
FIG. 3 is a detailed logic diagram of a portion of the "build sublist system control logic" shown as element 10 in FIG. 1.
Figure 3:
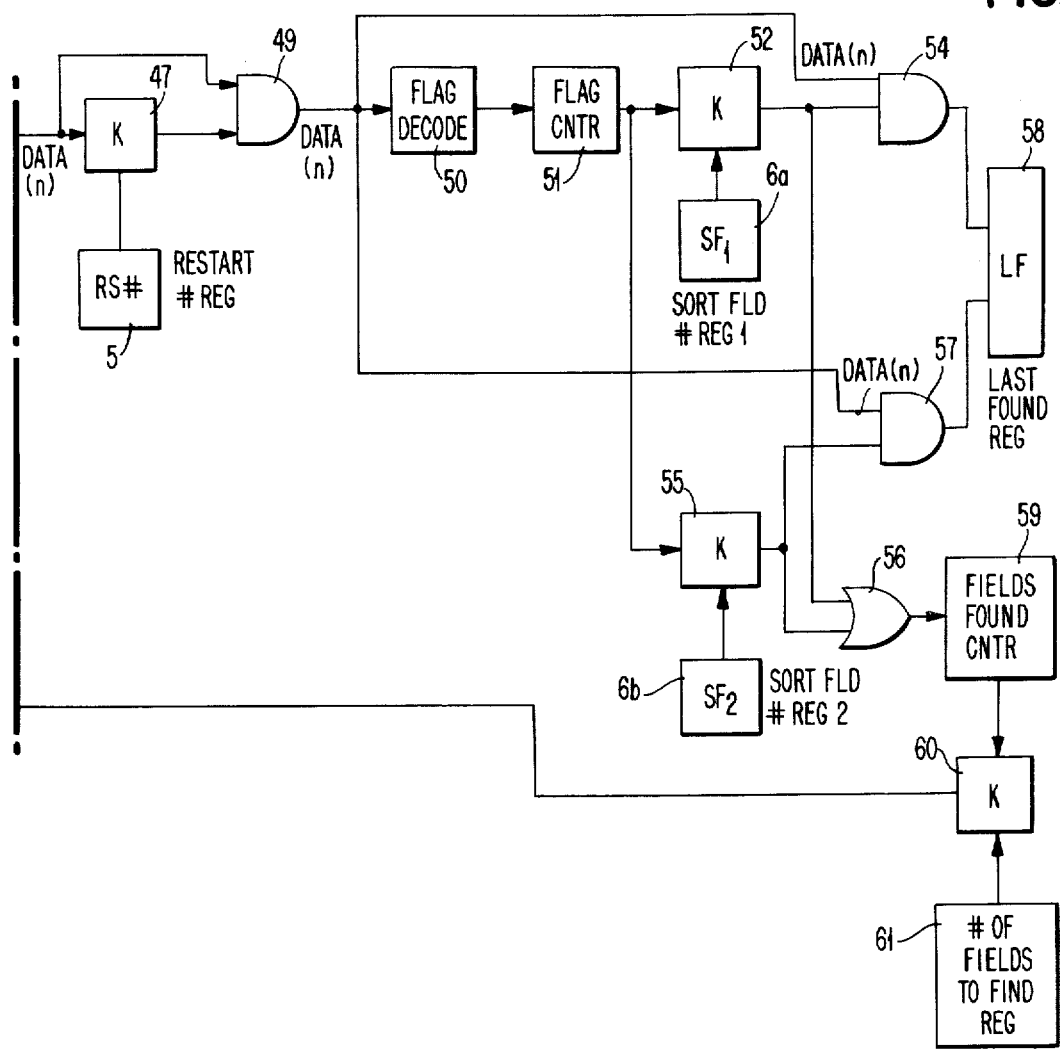

The build sublist system control logic 10 is shown in detail beginning at FIG. 3. At the beginning of the operation when the latches are reset, a reset pulse is applied to input lines 38 of storage access controller 35 and block number counter 36. This causes block number counter 36 to point to the first block of storage 1. At this time, storage access controller 35 moves to the beginning of the storage and causes a reading transducer to begin reading data from the beginning of the first block of the storage. For details, as to the operations of a storage access controller in pointing to data blocks in a typical device, e.g., disc containing a plurality of tracks, each corresponding to a block, please refer to U.S. Pat. No. 4,089,029. This data is read into I/O buffer 2 and is available at the input of AND gate 41. If the speed of the logic can be synchronized with the reading speed of storage 1, no I/O buffer is needed. I/O buffer 2 is needed only to allow for different operating speeds of the logic and storage reading. Thus, I/O buffer 2 may typically store a small fraction of one storage block from storage 1.

The portion of the operation performed by the logic of FIG. 3 is to load the last found register 58 with the data from the sort fields, and the record number of the record, specified by the operator during initialization, which was the last previous record used by the printer in the sorting process. Thus, with clock pulses being gated through AND gate 4, as previously described, and with the last found register complete latch 40 reset, data is gated through AND gate 41 to COMPARE 42. When the data applied to COMPARE 42 matches the record begin code bit pattern stored in register 43, the data is gated through AND gate 46 to COMPARE 47. The contents of the restart register 5 are also applied to COMPARE 47 such that if the record identifier stored in the record just subsequent to the record begin code matches the record identifier loaded by the operator into the restart register, a positive output signal from COMPARE 47 allows the data to be further gated through AND gate 49.

Records on this block continue to be read until a match occurs in COMPARE 47. If no match occurs on this block, an end of block code recorded at the end of each block, applied to COMPARE 44 will match with an end of block code stored in register 45 to provide a positive output signal on line 37 which is applied to block counter 36 to cause access controller 35 to access the beginning of the next block on storage device 1. When a match occurs in COMPARE 47, the subsequent data in the record is gated through AND gate 49 and is available at flag decode 50.

Each of the fields in the record is preceded by a flag which is decoded at flag decode 50 to allow the fields to be counted at flag counter 51. The field number currently being read is input to COMPARE 52 and COMPARE 55. When this field number currently being read matches with either of the operator specified sort fields in sort field register 6A or sort field register 6B, respectively, COMPARE 52 or 55, respectively, provides a positive output signal that allows the data from this field to be gated through AND gate 54 or AND gate 57, respectively, into the last found register 58 which contains a separate section for the data in each of the two sort fields that were specified by the operator. As each of these fields is found, the fields found counter 59 is bumped by the positive signals from COMPARE 52 and 55 that are gated through OR gate 56. When the contents of the field found counter, applied to COMPARE 60, match the contents of the number of fields to find register 61 (in this embodiment two), a positive signal is output by compare 60 that is applied along line 38 to reset the access controller 35 back to the beginning of a block and to reset the block counter 36 back to block 1.

The last found register 58 now contains the sort field data against which the sort field data in all qualified records will be compared. If a qualifying record has sort field data that is less than the data stored in the last found register, that record, even though it qualifies, will be ignored as having been used earlier in the sort sequence. Records that qualify having sort field data greater than that found in the last found register will be sorted in this subsequent operation.

This description has assumed that the operation is being restarted from an interruption in a previous sorting operation of this file. Obviously, the last found register 58 could be loaded with zeros or "light" codes at the absolute beginning of a sort so that any sort field data found in a qualifying record would be considered. In this case the last found register complete latch 40 must be set.

Figure 4:
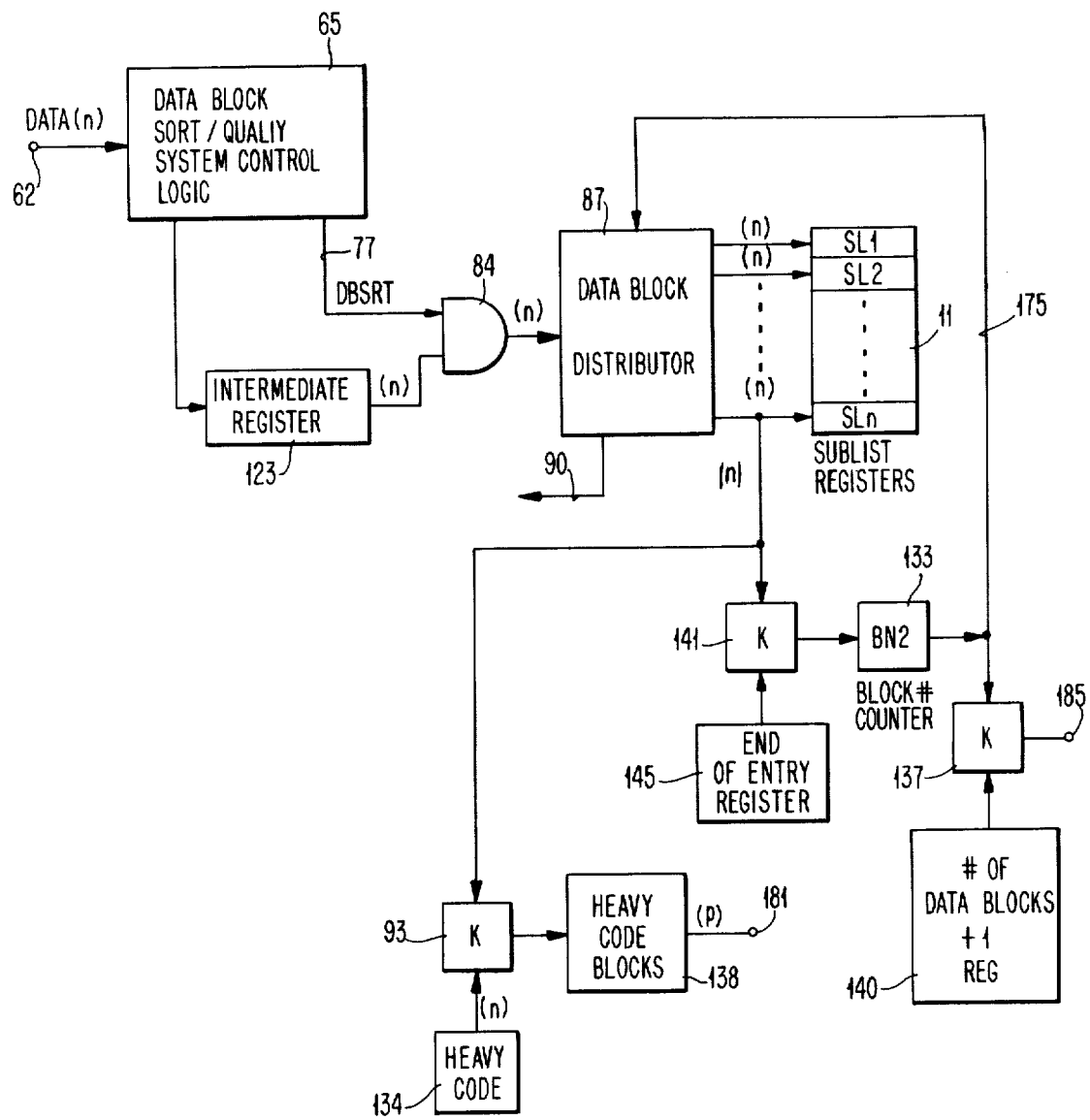
FIG. 4 shows the logic for storing the list of lowest data from the sort fields of each qualified record of each block.
Figure 5:
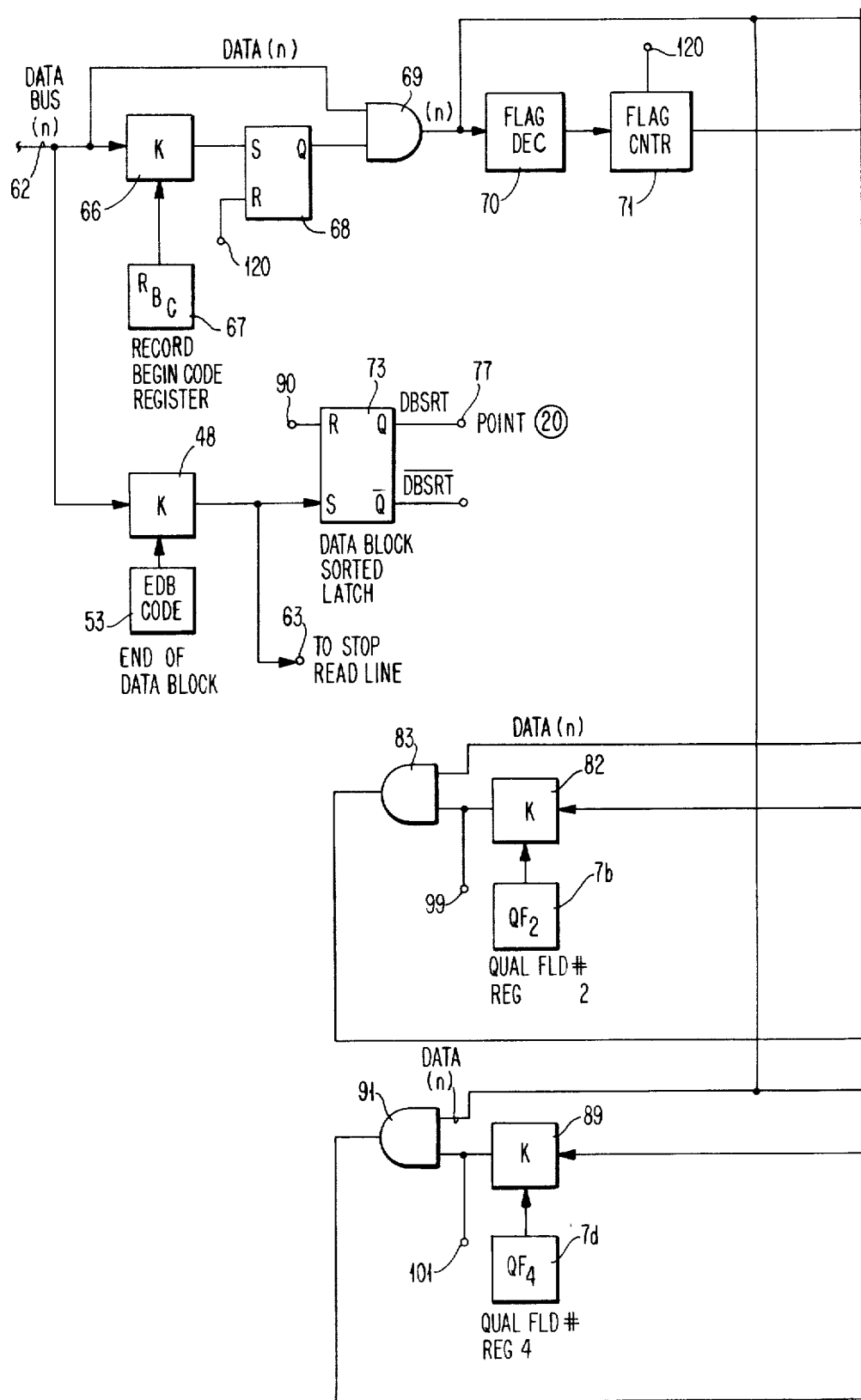
FIG. 5-7 are detailed logic diagrams of the "data block sort/qualify system control logic" shown as element 65 in FIG. 4.
Figure 5:
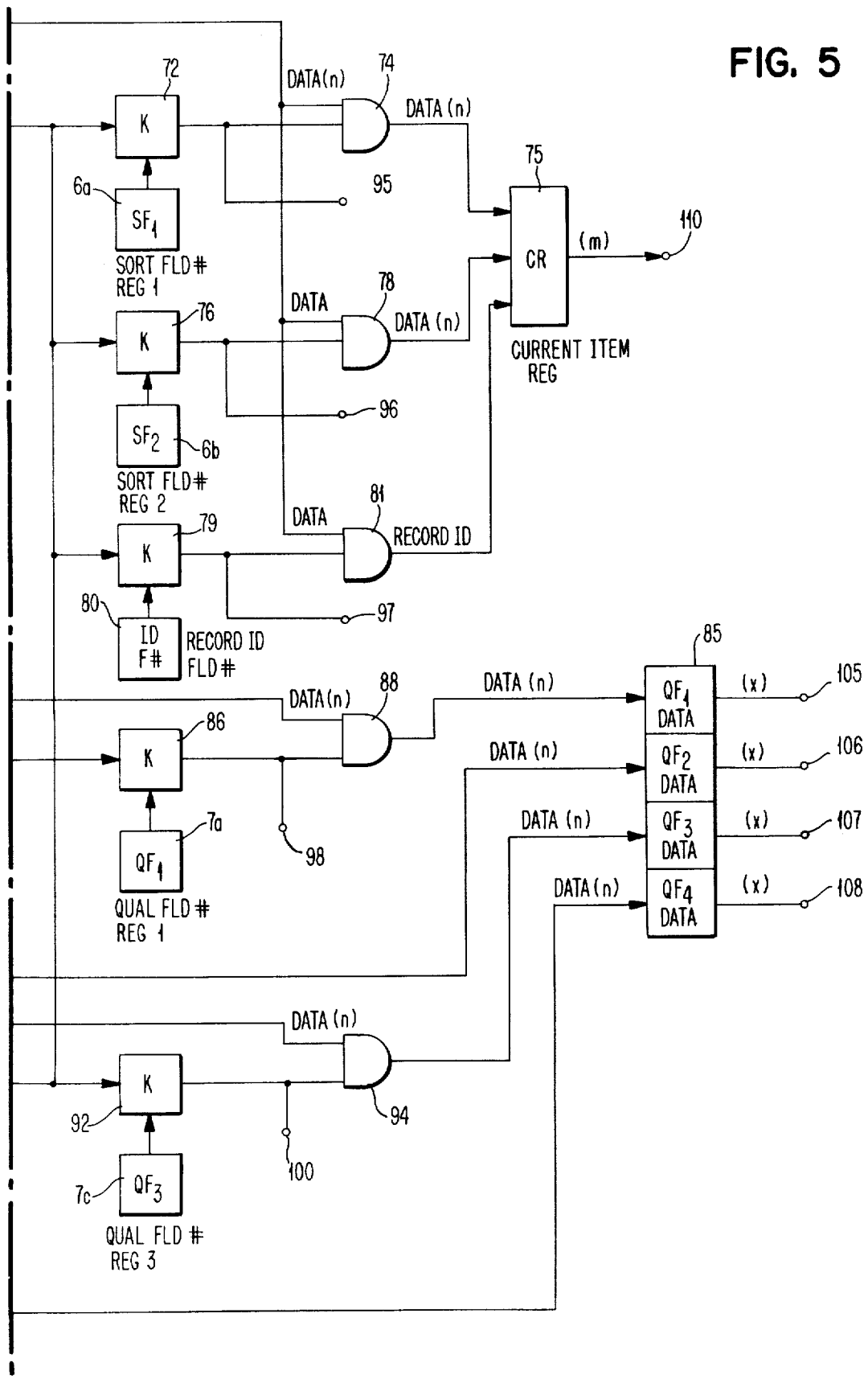
Figure 6:
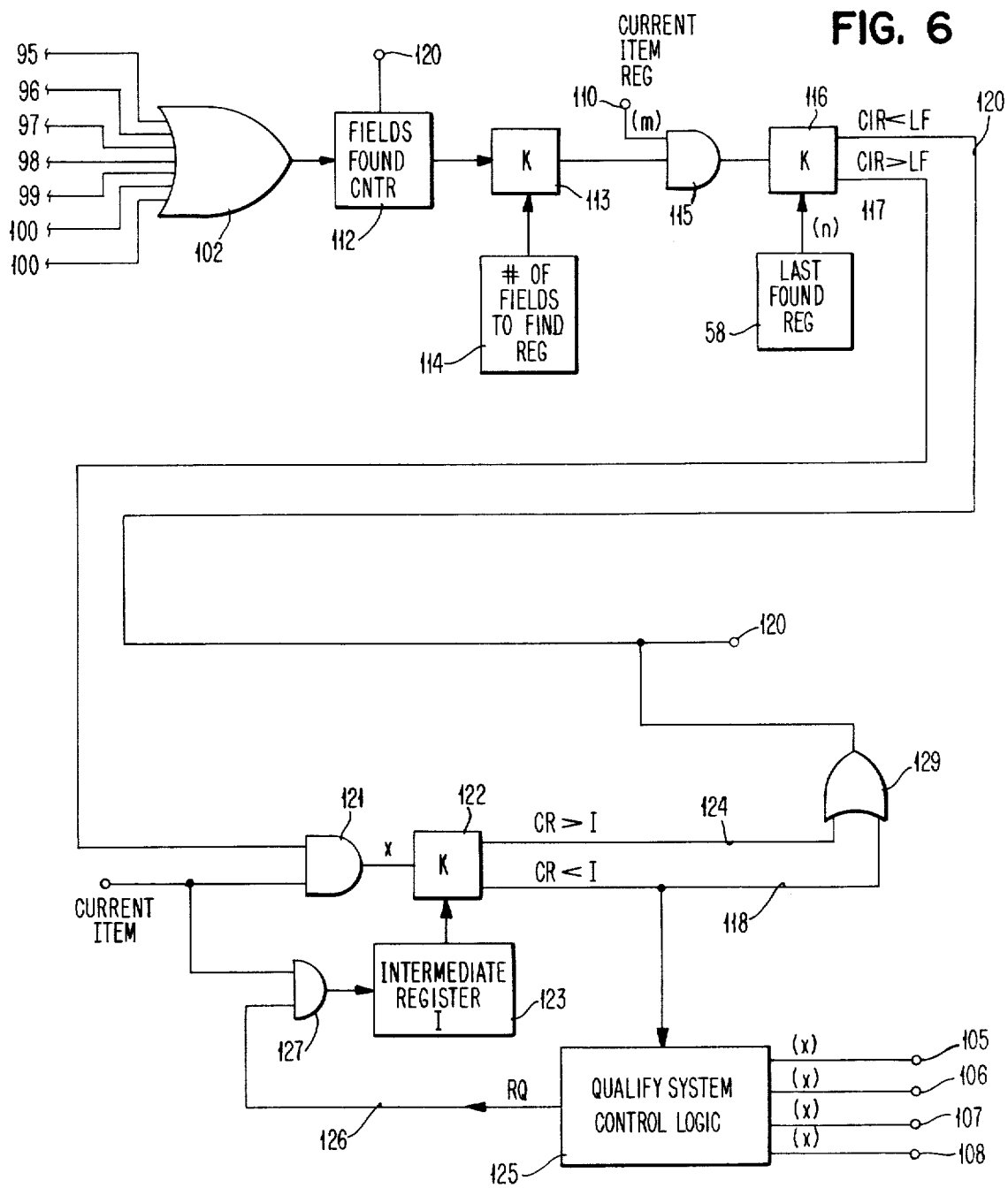
Figure 7:
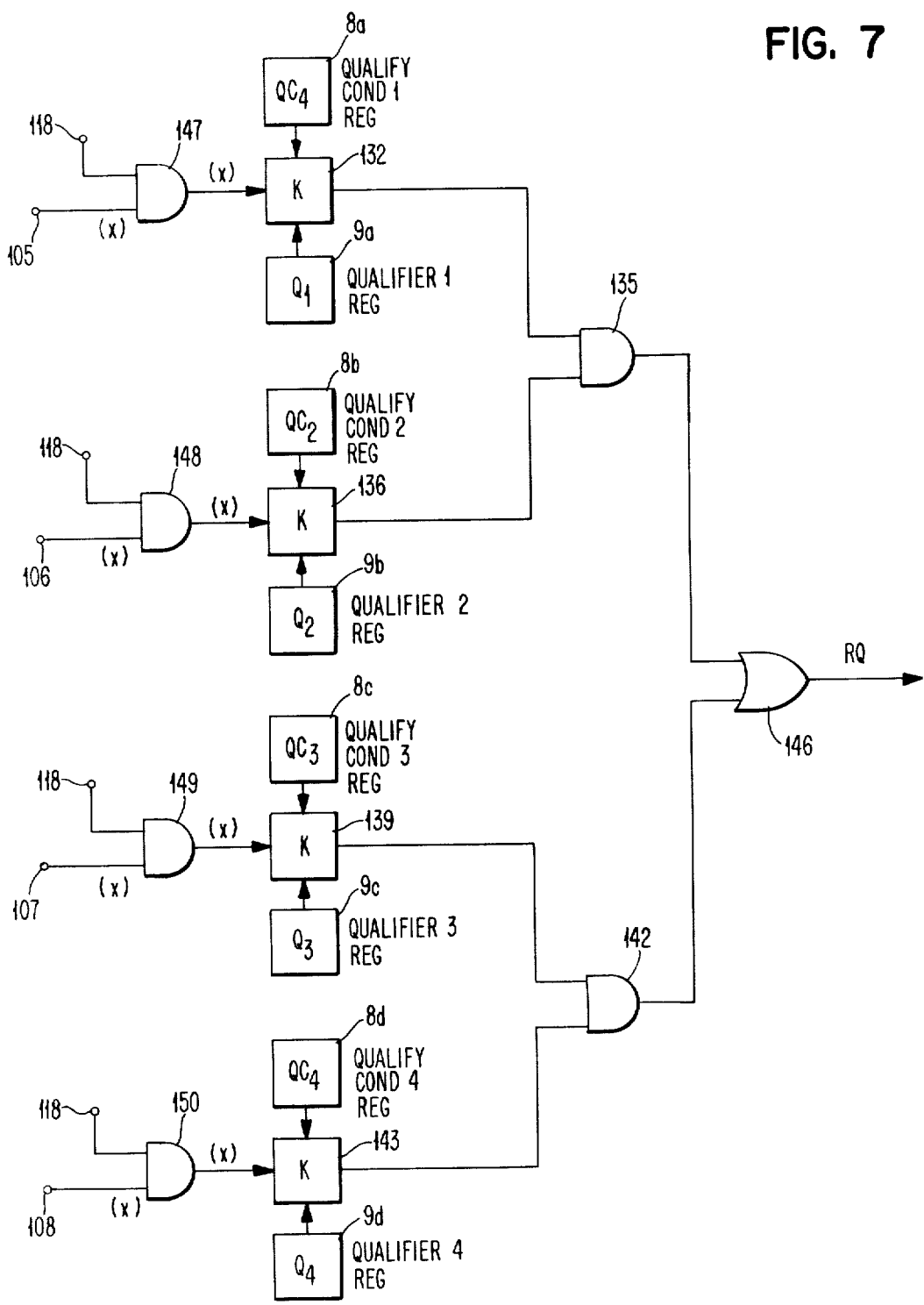

The positive signal output from COMPARE 60 also sets the last found register complete latch 40 which disenables AND gate 41 and enables AND gate 39 to provide data on line 62 to the data block sort/qualify system control logic 65, FIG. 4. The function of control logic 65, shown in detail in FIGS. 5-7, is to examine each of the records of each block, compare the sort fields of each record against the sort fields stored in the last found register, choose from the records on each block that qualify, the sort fields having the lowest data that is equal to or greater than the data stored in the last found register and store this data into a section of sublist registers 11 corresponding to the track on which the record was found. Along with the data, the record identifier number is stored to identify the record from which the data was taken.

Referring now to FIG. 5 it should be remembered that the last found register 58 has just been loaded and that data is now available on line 62 which will include the first record stored on the first data block of storage 1. The data on line 62 is applied to an input of COMPARE 66. To another input of COMPARE 66 is applied the bit pattern for a record begin code stored in register 67. When a match occurs record latch 68 becomes set to enable AND gate 69 to gate the record data therethrough. The data is applied to an input of AND gates 74, 78, 81, 83, 88, 91, and 94. Each time a field identifying flag is decoded by decode 70, counter 71 is bumped upward by 1 from its initially reset position. The counter contents are applied to inputs of COMPARE circuit 72, 76, 79, 82, 86, 89, and 92. The operator specified sort field numbers in registers 6a and 6b are applied to COMPARE circuits 72 and 76 respectively. The field number of the field in each record containing the record identifier number (typically one) is stored in register 80 and applied to COMPARE 79. The operator specified qualifier field numbers in registers 7a-7d are applied to COMPARE circuits 86, 82, 92, and 89, respectively.

Thus, each time a match occurs in a compare circuit, data following the flag causing the match is gated into either the current item register 75 or the qualifier register 85. Also, each time a match occurs, a positive signal is provided from the compare circuit in which the match occurs to one of lines 95-101 that are connected to the input of OR gate 102, FIG. 6.

Referring now to FIG. 6, each signal applied to OR gate 102 causes the fields found counter 112 to be bumped upwardly from zero. The contents of counter 112 are applied to COMPARE 113 which receives another input from register 114 that stores the number of fields to find. When a match occurs in COMPARE 113 indicating that all seven fields have been found, a positive output therefrom is applied to AND gate 115 which allows the contents of the current item register 75 (FIG. 5) on line 110 to be gated therethrough for application to COMPARE 116. The contents of the last found register 58 (FIG. 3) are also applied to COMPARE 116. If the contents of the sort fields stored in the current item register 75 are greater than the sort fields stored in the last found register 58, a positive signal from COMPARE 116 is applied along line 117 to an input of AND gate 121. This allowed the data from the sort fields stored in the current items register 75 on line 110 to be gated through AND gate 121 to COMPARE 122. The contents of intermediate register 123 are also applied to COMPARE 122. During system initialization, register 123 is loaded with "heavy" codes to that line 118 will become positive to signify that the contents of the current item register 75 are less than the present, "heavy" contents of the intermediate register 123. The positive signal on 118 is applied to an input of the qualify system control logic 125. Also applied to control logic 125 is the data that was accumulated in qualifier register 85 containing the data in each of the operator specified qualifier fields of the record. The data in each of these fields is output from register 85 along lines 105-108 to the control logic 125.

FIG. 7 is a detailed logic diagram of the qualify system control logic 125 of FIG. 6. Th positive signal on line 118 is applied to each of the AND gates 147-150 to enable the operator selected qualify field data on lines 105-108 to be gated respectively therethrough to the input of compare circuit 132, 136, 139, and 143, respectively. Also input to these COMPARE circuits are the operator specified contents of the qualifier registers 9a-9d in the preceding example—engineers, Kansas, accounts, Illinois—and the operator specified conditions that were loaded into registers 8a-8d (in the preceding examples—equals, equals, equals, and equals).

Further conditions shown by the logic of this embodiment are that both qualifiers 1 and 2 or 3 and 4 must be met. It will be obvious to those having skill in the art that the operator may specify fields in a manner which provides different logical results from that described in this example. It will also be obvious that the configuration of gates 135, 142, and 146 can be changed to provide other qualification logic and that more qualifying fields may be easily handled by expansion of this technique.

Assuming that a positive RQ signal is provided by the qualify system control logic 125, this signal is applied along 126 to an input of AND gate 127 which enables the contents of the current item register 75 to be gated into the intermediate register 123 and written over the "heavy" codes therein.

In FIG. 6, in the event that the contents of the current item register 75 are less than the contents of the last found register 58, COMPARE circuit 116 provides a positive signal on line 120. Similarly, when the contents of the current item register 75 are greater than the contents of the intermediate register 123, a positive signal on line 124 is gated through OR gate 129 to line 120. When the contents of the current item register 75 are less than the contents of the intermediate register 123, a positive signal on line 118 is also gated through OR gate 129 on line 120. (A positive output signal will not be produced on line 124 in this first example, since, for this special case, the intermediate register 123 was loaded with "heavy" codes greater than any contents of the current item register.) The positive signal on line 120 is then applied to reset the fields found counter 112, the flag counter 71 (FIG. 5) and latch 68 (FIG. 5). Resetting these counters and latches causes the process to continue by moving to the next record of the data block, for sorting to continue. For each record in the data block, the sort fields and the record identifier are accumulated in current item register 75 and the data from the qualifier fields is accumulated in qualifier register 85. If the sort fields data is less than the data in the last found register 58, the system ignores this record and proceeds to analyze the next succeeding record. If the data in the sort fields of this record is greater than that stored in the last found register, the data is compared with the sort field data stored in the intermediate register from a previous record. If the sort field data in this record is greater than that stored in the intermediate register this record is ignored from this point and the system begins to analyze the next succeeding record. If, however, the sort field data in this record is less than that in the intermediate mediate register from a previous record, and if the record qualifies according to the qualifying information specified by the operator, this sort field data is stored in the intermediate register. In this manner, at the end of a block of data, after numerous records have been analyzed, the intermediate register will contain the sort field data of the qualifying record having the lowest sort field data that is greater than the sort field data stored in the last found register.

In FIG. 5 as the data is analyzed from each block it is applied to an input of COMPARE 48. Also applied to COMPARE 48 is the bit pattern of the end of data block code stored in register 53. When a match occurs in COMPARE 48, the data block sorted latch 73 becomes set to provide a positive signal on the output line 77 thereof.

Referring now to FIG. 4, the positive signal on line 77 is applied to an input of AND gate 84 to allow the contents of the intermediate register 123 to be gated via AND gate 84 through data block distributor 87 into the portion of the sublist registers 11 corresponding to the block from which the data was obtained. When the data block distributor 87 routes the contents of the intermediate register 123 into the appropriate portion of the sublist registers 11, distributor 87 also provides a positive signal on line 90 that is applied to the reset input of data block sorted latch 73 (FIG. 5), to reset this latch to allow the next block of records to be sorted.

Each of the blocks of records are sorted in the manner described above. At the beginning of analysis of the records of each block, the intermediate register is again initialized with "heavy" codes. Thus, if no qualifying records are found on the block having sort fields greater than that stored in the last found register 58, these heavy codes are loaded into the portion of the sublist registers 11 corresponding to that track. Obviously, lower data from qualifying records will be sorted out in lieu of the heavy codes.

In FIG. 4, each time a transfer of codes from the intermediate register 123 into the appropriate portion of the sublist registers 11 takes place, the transferred codes are also applied to COMPARE circuits 93 and 141. Also applied to COMPARE circuit 93 is the heavy code bit pattern permanently stored in register 134, such that when a match occurs in COMPARE 93, the heavy code block counter 138 is incremented upwardly by one. The count of portions in the sublist registers 11 having heavy codes transferred thereto is made available at output 181 of counter 138.

Also applied to COMPARE 141 is the bit pattern of the end of entry of the data transferred into sublist registers 11, the bit pattern of which is stored in register 145. This end of entry may be a flag at the end of the transferred data, for example, that is hard wired into the intermediate register succeeding the other data that is transferred out of the intermediate register 123. Each time a match occurs in COMPARE 141, the block number counter 133 is incremented upwardly by one count so that when the next transfer of the contents of the intermediate register into the sublist registers 11 occurs, the data block distributor 87 will be addressing the appropriate portion of the sublist registers 11. Counter 133, of course, was set to one in the initialization process.

Register 140 stores a count that is equal to the number of data blocks (and, therefore, the number of separate storage portions in the sublist registers 11) plus one. After the contents of the intermediate register corresponding to the last storage block in storage 1 have been transferred into the sublist registers, the block number counter 133 will be incremented to a count that is one greater than the number of blocks of storage one. At this time, a match will occur in COMPARE 137 to provide a positive output signal on line 185 thereof which is applied to the set terminal of the sublist built latch, FIG. 3. At this time, analysis of the data on storage 1 is interrupted.

The next portion of the system operation is directed to finding the lowest sort field data in the sublist registers 11. The sort sublist system control logic 15 in FIG. 1 is shown in detail in FIG. 8. The sublist sorted latch 14 and the sublist empty latch 184 remain reset from the beginning of the operation such that the positive $\overline{SS}$ and $\overline{SE}$ signals are applied to inputs of AND gate 13. At the end of the preceding portion of operation the sublist built latch 3 was set to provide the positive SB signal that is also applied to an input of AND gate 13. Thus, AND gate 13 is enabled to provide the clock signal to an input of AND gate 157. During initialization, the sublist item register 156 is set to one. This causes the output selector 155 to access the portion of the sublist registers 11 that contains the sort field data and record number from the first block in storage one. With AND gate 157 enabled, the sort field data and record number are gated into sublist item register 158. The sort field data portion of the contents now in register 158 are applied to an input of COMPARE 159. Also applied to another input of COMPARE 159 are the contents of answer register 21. Answer register 21 is initially loaded with heavy codes. With heavy codes now being compared with the sublist item register 158 contents, line 186 will become positive for any sort field data in the sublist item register other than heavy codes. The positive signal on line 186 is input to AND gate 164 to enable the contents of the sublist item register 158 to be gated into the answer register 21. The positive signal on line 186 is also input to AND gate 165 to enable the contents of the sublist item number register 156 to be gated into the answer block number register 23. Thus, register 23 stores the block number on storage one from which the sort field data in the answer register 21 was obtained. If heavy codes had been in the sublist item register 158 at the same time that the initializing heavy codes were in answer register 21, COMPARE 159 would have provided a positive signal on line 187, since line 187 becomes positive when the sublist item register 158 contents are greater than or equal to the answer register 21 contents. Likewise, in later cycles when the sublist item register contains either heavy codes or sort field data that is greater than that currently stored in the answer register 21, line 187 becomes positive.

Each time that new data is loaded into sublist item register 158, the resulting comparison drives either line 186 or line 187 positive. This positive signal is then gated through OR gate 163 into delay circuit 172. Delay 172 provides a one bit time delay so that at the end of the clock cycle, the sublist item register becomes incremented by one.

The contents of the sublist item register are continually applied to COMPARE 168. The number of items in the sublist plus one (also, the number of blocks on storage 1 plus one) is stored in register 169 and is also applied to COMPARE 168. When a match occurs, the positive output signal from COMPARE 168 is applied to set input of sublist sorted latch 14 which then provides the positive SS signal at the next bit time.

When the sublist has been sorted, the answer register 21 now contains the lowest sort field data in the sublist. The answer block number register 23 contains the block number on storage 1 from which the lowest sort field data in the sublist was obtained. The answer record number register 22 addresses that portion of the answer register 21 that contains the record identifier corresponding to the sort field data in the answer register. Thus, the lowest sort field data for any qualified record has been found, the sort field data is stored in answer register 21, the record number in storage 1 containing this lowest, qualified sort field data is stored in register 21 and the block number in storage 1 from which this data was obtained is stored in register 22. This is assumed that the operation was started from the beginning. If a restart number was loaded, the sort field data found is the lowest sort field data that is greater than the sort field data of the record from which the restart begun.

At this time, the positive SS signal from the set condition of latch 14 enables AND gate 166 to gate the record identifier contents of answer record number register 22 to the printer 18 via line 167. Also, the block number from which the record came is gated to the printer along line 161 from AND gate 160, which is also enabled by the positive SS signal. When the storage 1 is not being accessed for sorting, the printer 18 can access this record to merge variable data therefrom for printing.

The remaining phase of operation involves accessing the block of storage 1 from which the sort field data in the answer register was obtained, sorting any other qualified records in that block to obtain the record having the next higher qualified sort field data than that currently stored in answer register 21, and updating the sublist registers 11 to write this sort field data and record identifier over the sort field data and record identifier obtained in the preceding cycle.

Figure 9:
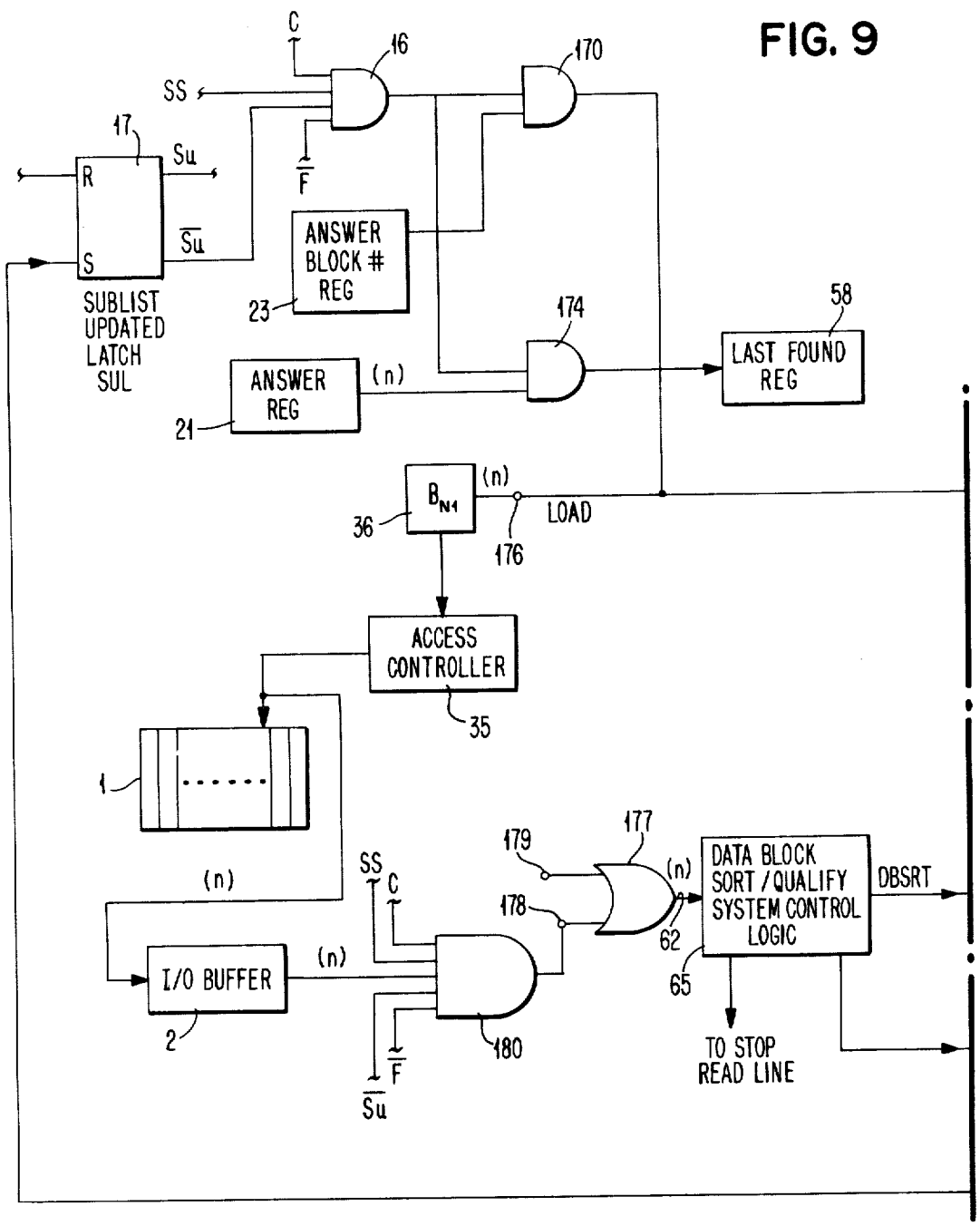
FIG. 9 is a detailed logic diagram of the "update sublist system control logic" shown as element 20 in FIG. 1.
Figure 9:
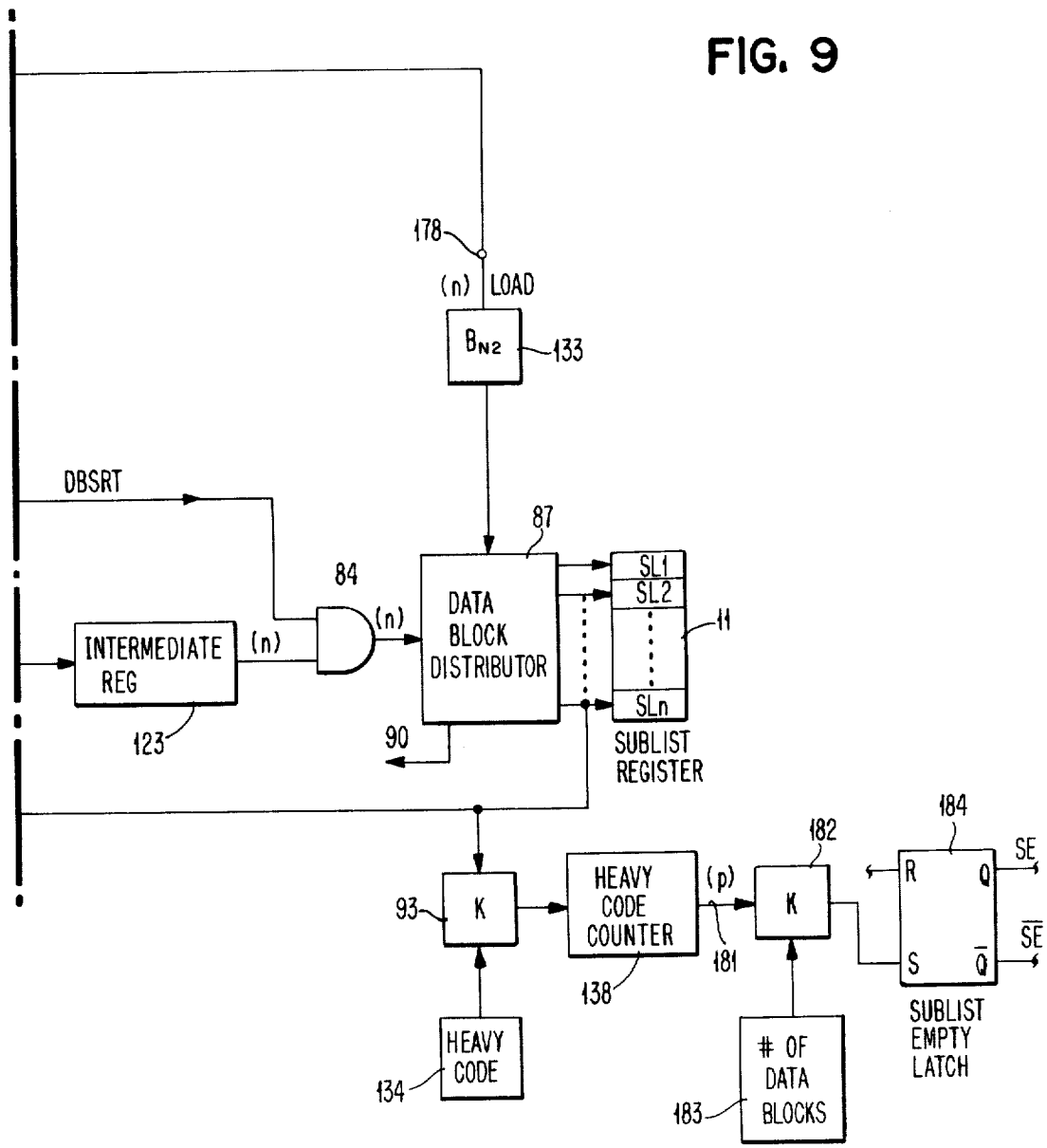

Referring now to FIG. 9, with the sublist updated latch 17 reset, the positive SS signal from the sublist sorted latch 14 allows the output of AND gate 16 to be driven positive with clock pulses. This positive output of AND gate 16 enables AND gate 174 to gate the answer register 21 contents into the last found register 158. The positive output of AND gate 16 also enables AND gate 170 to gate the answer block number register 23 contents into the LOAD terminal 178 of the block number counter 133. This causes the data block distributor 87 to point to the portion of sublist registers 11 from which the answer was obtained so that this portion of sublist registers 11 can be updated. The answer block number register contents are also gated into the LOAD terminal 176 of block number counter 36 to cause the access controller 35 to access the block on storage 1 from which the answer register contents were obtained. With the same signals enabling AND gate 180 as those that enable AND gate 16, the records on the access block of storage 1 are read from buffer 2 through AND gate 180 along line 178, through OR gate 177 and into the data block sort/qualify system control logic 65, as shown in FIGS. 5, 6, and 7. For the purposes of simplification, subtantially instant access by access controller 35 to any data block in storage 1 is assumed; however, an appropriate ACCESS COMPLETED term may be added to AND gate 180 to inhibit the sorting and qualifying until the appropriate track has been accessed.

At the end of sorting and qualifying the single data block on storage 1 from which the previous answer was obtained, the intermediate register 123 is loaded with the new answer of the sort field data and record number of a qualified record on this block of storage 1, or, alternatively, intermediate register 123 is loaded with heavy codes. In either case, the positive DBSRT signal from data block sorted latch 73 enables AND gate 84 to gate the contents of the intermediate register 123 through the data block distributor 87 into the appropriate portion of sublist registers 11 as specified by the count previously loaded in block number counter 133. This transfer provides a positive signal to the set input of the sublist updated latch 17, which causes this latch to drop the positive $\overline{SU}$ signal to inhibit further updating. Thus, the sublist registers 11 have been updated so that a new sort of the sublist can occur.

Continued alternate cycles of sorting the sublist and then updating the sublist can be performed. Each time an update occurs, the codes transferred into the sublist registers 11 are applied to an input of COMPARE 93. Heavy codes stored in register 134 are applied to another input of COMPARE 93, and when a match occurs the positive output signal therefrom bumps the heavy code counter 138. The contents of the heavy code counter 138 are applied to COMPARE 182. Also applied to COMPARE 182 is the count of data blocks (also, sublist register 11 portions) stored in register 183. Thus, when all portions of the sublist contain heavy codes, a positive signal will be provided by COMPARE 182 to the set input of the sublist empty latch 184. This will indicate that the sublist is empty of any qualified record sort field data. The positive SE signal from latch 184 enables AND gate 31 to gate clock pulses through OR gate 32 to set the finished latch 33. The positive F signal output therefrom inhibits further operation of the system.

The preceding description assumes that the operation is halted at the end of each update of the sublist. The sequence can be easily modified to be run continuously, alternating between updating and further sorting of the sublist until the sublist is empty, simply by removing the logic of FIG. 2. The $\overline{F}$ term is then dropped from each gate previously dependent thereon. In this manner, the system could run to accumulate a list of qualified record identifier numbers in an appropriate sequence for future access.

Figure 8:
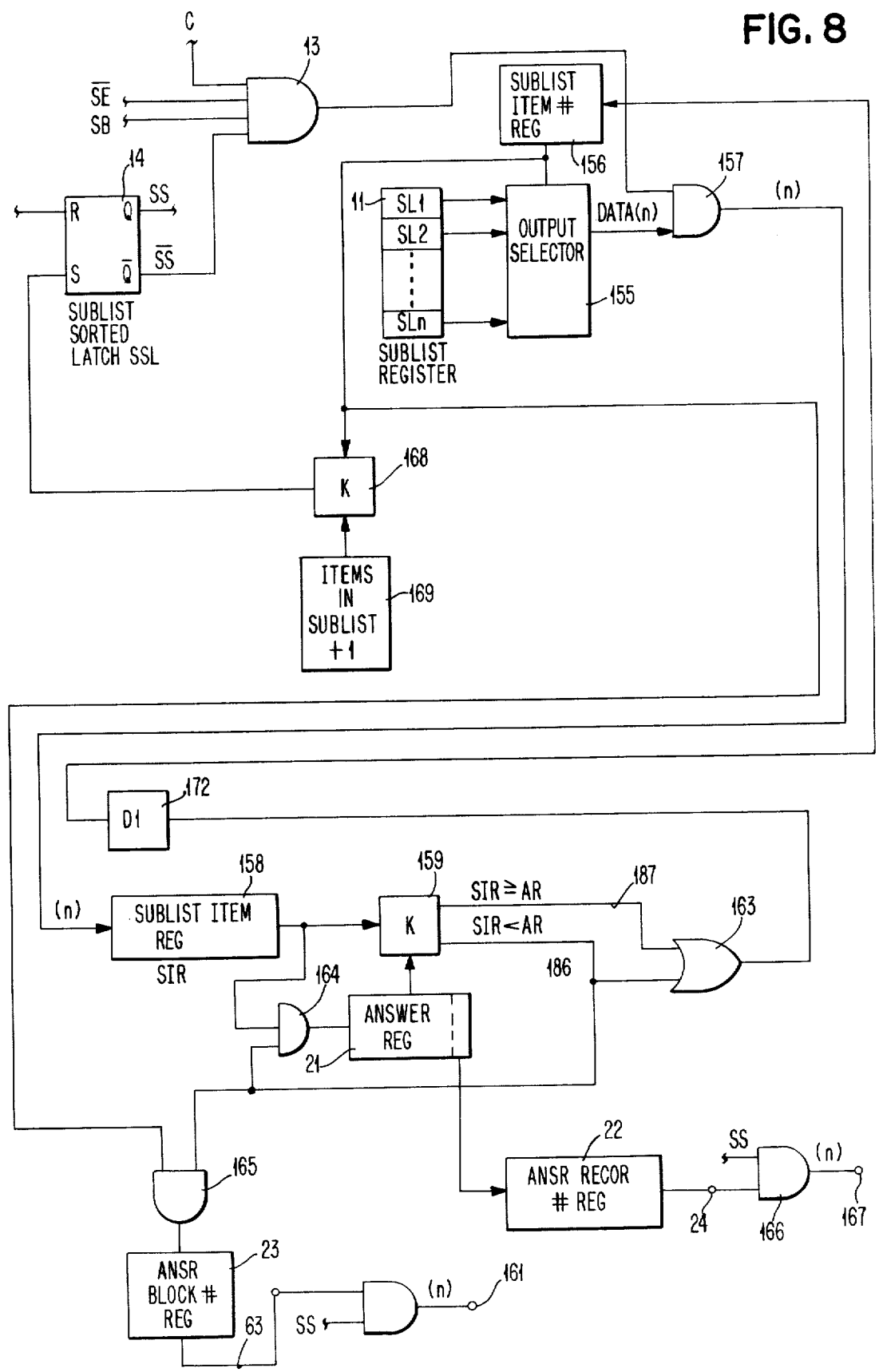
FIG. 8 is a detailed logic diagram of the "sort sublist system control logic" shown as element 15 in FIG. 1.

Referring to the qualify COMPARE circuits 132, 136, 139, and 143 in FIG. 7 and the sort COMPARE circuits 116 and 122, FIG. 6, and 159, FIG. 8, these circuits may be configured to be transparent to the upper or lower case bit configuration of alphabetic text characters such that sorting will be the same regardless of which letters in a name or word are in upper or lower case text. This configuration may take the form of OR circuits in the COMPARE circuits to respond to decoded upper or lower case characters, or the code set for the characters may be chosen such that a predetermined bit position status in the character indicates the upper or lower case status of the character. In this configuration, this bit position is ignored to ignore the case of the character in sorting.

With reference to the qualifying text that is input by the operator, "don't care" codes may be defined to allow the system to qualify relative to only those character positions in the qualify field that correspond to valid characters input by the operator. If + is the don't care code, for example, then all of the records having a particular field beginning with S may be qualified by entry of S+++, etc. into the appropriate qualify register 9a-d, with equals being set into the corresponding qualify condition register 8a -d, and the particular field number being set into the corresponding qualify field number register 7a-d.

In operation, therefore, an operator may load a sequence of qualifiers and obtain an ordered sequence of printed, individualized documents from the records in the file that qualify. The sorting is based on particular fields of the record chosen by the operator. When the record is accessed by the printer, other fields may be used in the individualized document. It is not necessary that any of the qualifier fields or sort fields are used. In other applications, it may be desirable to print a listing of records or portions of the records in a different order than that in which they are physically stored in the file. The disclosed system provides for an ordered sequence of qualified records output without the limitation of merging this data into an individualized document.

Thus, a system has been described for sorting records of a file to find the record in the file having the highest or lowest data in one or more fields of the records, provided that the record qualifies to be sorted in accordance with the data in other fields of the records. The system uses a minimum amount of random access memory. A restarting capability has also been disclosed so that a long printing job, for example, may be interrupted without having to resort through the previously used records.

While the invention has been particularly shown and described with reference to a preferred embodiment thereof, it will be understood by those skilled in the art that various changes in form and details may be made therein without departing from the spirit and scope of the invention. For example, it is understood that a data may be sorted in descending order from a highest initial value rather than in ascending order from a lowest initial value.

What is claimed is:

1. A system for sorting records of a file of any length stored on any number of blocks on a serial storage device comprising:
   first memory means for storing an initial data value;
   second memory means for storing qualifying data;
   first comparison means for comparing said initial data value with the data of a first field of said records;
   second comparison means for comparing said qualifying data with a second field of said records;
   third memory means for storing a list including an entry corresponding to each block of the storage device, each of said entries including a record identifier corresponding to the record of said block having, in said first field, the lowest data above said initial data value, said second field of said record also comparing with said qualifying data, each of said entries also including, in addition to said record identifiers, said data of said first field;
   third comparison means for comparing data portions of said entries with each other to find the lowest data in said list;
   means for accessing the record on said serial storage device identified by said record identifier corresponding to said lowest data found in said list; and
   printing means for printing at least one field of said accessed record.

2. The system of claim 1 including means responsive to finding said lowest data in said list for replacing said initial data value with said lowest data in said list.

3. The system of claim 2 wherein said initial value comprises light codes stored in a register of said system.

4. A system for sorting records of a file of any length stored on any number of blocks on a serial storage device comprising:
   first memory means for storing an initial data value;
   second memory means for storing qualifying data;
   first comparison means for comparing said initial data value with the data of a first field of said records;
   second comparison means for comparing said qualifying data with a second field of said records;
   third memory means for storing a list including an entry corresponding to each block of the storage device, each of said entries including a record identifier corresponding to the record of said block having, in said first field, the highest data below said initial data value, said second field of said record also comparing with said qualifying data, each of said entries also including, in addition to said record identifiers, said data of said first field;

third comparison means for comparing data portions of said entries with each other to find the highest data in said list;

means for accessing the record on said serial storage device identified by said record identifier corresponding to said highest data found in said list; and printing means for printing at least one field of said accessed record.

5. The system of claim 4 including means responsive to finding said highest data in said list for replacing said initial data value with said highest data in said list.

6. The system of claim 5 wherein said initial value comprises heavy codes stored in a register of said system.

7. The system of claim 1 further comprising means in response to operator entry of a record identifier for accessing the record identified by said identifier and storing the data of a first field thereof in a last found register, the value of said data defining said initial data value.

8. The system of claim 7 wherein both of said means for finding the qualified record in each block having, in a first field of said record, the lowest data above an initial data value and said means for finding the lowest data in said list include means for ignoring the upper case or lower case status of any text characters included in the data said first field.

9. A system for sorting records of a file stored on a plurality of blocks of a serial storage device comprising:

first memory means for storing an initial data value;

second memory means for storing operator specified qualifying data and qualifying conditions, said conditions including equal and not equal;

first comparison means for comparing said initial data value with the data of a first field of said records;

second comparison means for comparing said qualifying data and said qualifying conditions with a second field of said records;

third memory means for storing a list including an entry corresponding to each of said blocks, each of said entries including a record identifier corresponding to the record of said block having, in said first field, the lowest data above said initial data value, said second field of said record also comparing with said qualifying data and said qualifying conditions, each of said entries also including, in addition to said record identifiers, said data of first field;

third comparison means for comparing data portions of said entries with each other to find the lowest data in said list;

means for accessing the record on said serial storage device identified by the record identifier corresponding to the lowest data found in said list; and printing means for printing at least one field of said accessed record.

10. The system of claim 9 including means in response to operator entry of "don't care" qualify codes for ignoring, for qualification purposes, data codes in said second field corresponding in position from the beginning of said second field, to said "don't care" codes relative to the position of said "don't care" codes from the beginning of the operator entered qualify codes.

* * * * *